United States Patent
Saarnivala et al.

(10) Patent No.: US 11,438,230 B2
(45) Date of Patent: Sep. 6, 2022

(54) TEMPLATE-BASED REGISTRATION OF DEVICES

(71) Applicants: Arm IP Limited, Cambridge (GB); Arm Limited, Cambridge (GB)

(72) Inventors: Mikko Johannes Saarnivala, Oulu (FI); Szymon Sasin, Oulu (FI); Yongbeom Pak, Oulu (FI); Hannes Tschofenig, Tirol (AT)

(73) Assignees: Arm IP Limited, Cambridge (GB); Arm Limited, Cambridge (GB)

( * ) Notice: Subject to any disclaimer, the term of this patent is extended or adjusted under 35 U.S.C. 154(b) by 0 days.

(21) Appl. No.: 17/310,331

(22) PCT Filed: Jan. 9, 2020

(86) PCT No.: PCT/GB2020/050042
§ 371 (c)(1),
(2) Date: Jul. 28, 2021

(87) PCT Pub. No.: WO2020/157448
PCT Pub. Date: Aug. 6, 2020

(65) Prior Publication Data
US 2022/0086045 A1    Mar. 17, 2022

(30) Foreign Application Priority Data
Feb. 1, 2019    (GB) ..................... 1901414

(51) Int. Cl.
*H04L 41/084*      (2022.01)
*H04L 41/0806*     (2022.01)
(Continued)

(52) U.S. Cl.
CPC ...... *H04L 41/0843* (2013.01); *H04L 41/0806* (2013.01); *H04L 67/12* (2013.01); *H04L 67/16* (2013.01)

(58) Field of Classification Search
USPC ......................................... 709/222
See application file for complete search history.

(56) References Cited

U.S. PATENT DOCUMENTS

| 5,349,643 A | 2/1994 | Cox et al. |
|---|---|---|
| 5,872,968 A | 2/1999 | Knox et al. |

(Continued)

FOREIGN PATENT DOCUMENTS

| CN | 109218142 | 1/2019 |
|---|---|---|
| EP | 2466791 | 6/2012 |

(Continued)

OTHER PUBLICATIONS

Combined Search and Examination Report corresponding to GB 1901414.1. dated Aug. 16, 2019.

(Continued)

*Primary Examiner* — Wing F Chan
*Assistant Examiner* — Leon Y Tseng
(74) *Attorney, Agent, or Firm* — Patterson Thuente Pedersen, P.A.

(57) ABSTRACT

Broadly speaking, the present techniques relate to a computer implemented method comprising: receiving, at a first server, one or more device identifiers from a device; determining, with the first server, the availability of a resource template for the device based on or in response to the one or more device identifiers; when the resource template is available for the device: provisioning, from the first server to the device, a template identifier to enable the device to register with a second server using the template identifier.

18 Claims, 14 Drawing Sheets

(51) Int. Cl.
*H04L 67/51* (2022.01)
*H04L 67/12* (2022.01)

(56) References Cited

U.S. PATENT DOCUMENTS

| | | | |
|---|---|---|---|
| 6,463,535 B1 | 10/2002 | Drews | |
| 7,363,514 B1 | 4/2008 | Behren | |
| 7,882,345 B1 | 2/2011 | Christensen | |
| 7,971,045 B1 | 6/2011 | Currid et al. | |
| 8,370,491 B1 | 2/2013 | Breau et al. | |
| 9,064,117 B1 | 6/2015 | Worsley | |
| 10,554,731 B2 | 1/2020 | Pak et al. | |
| 2005/0010758 A1 | 1/2005 | Landrock et al. | |
| 2006/0075242 A1 | 4/2006 | Aissi et al. | |
| 2007/0220266 A1 | 9/2007 | Cooper et al. | |
| 2009/0129597 A1 | 5/2009 | Zimmer et al. | |
| 2009/0276620 A1 | 11/2009 | McCarron et al. | |
| 2010/0165877 A1* | 7/2010 | Shukla | H04L 41/0843 370/254 |
| 2012/0079031 A1 | 3/2012 | Matthews et al. | |
| 2013/0160094 A1 | 6/2013 | Luo | |
| 2013/0227036 A1 | 8/2013 | Kang | |
| 2013/0324121 A1 | 12/2013 | Kwon | |
| 2014/0006586 A1 | 1/2014 | Hong et al. | |
| 2014/0025742 A1 | 1/2014 | Ukkola | |
| 2014/0089652 A1 | 3/2014 | Cerri et al. | |
| 2014/0330952 A1 | 11/2014 | Starsinic et al. | |
| 2015/0071139 A1 | 3/2015 | Nix | |
| 2015/0296470 A1 | 10/2015 | Kim et al. | |
| 2015/0358824 A1 | 12/2015 | Kim et al. | |
| 2016/0065556 A1 | 3/2016 | Sasin et al. | |
| 2016/0072808 A1 | 3/2016 | David et al. | |
| 2016/0337453 A1* | 11/2016 | Lee | G06F 9/451 |
| 2017/0039373 A1 | 2/2017 | Sasin et al. | |
| 2017/0041287 A1 | 2/2017 | Pak et al. | |
| 2017/0094592 A1 | 3/2017 | Tabatabaei et al. | |
| 2017/0099332 A1 | 4/2017 | Bullotta | |
| 2017/0289806 A1* | 10/2017 | Girdhar | H04L 67/12 |
| 2017/0295503 A1 | 10/2017 | Govindaraju et al. | |
| 2018/0217966 A1 | 8/2018 | Buttolo et al. | |
| 2019/0095644 A1* | 3/2019 | Park | G06F 16/2255 |
| 2020/0218793 A1* | 7/2020 | Storm | G06V 40/171 |
| 2022/0103634 A1 | 3/2022 | Saarnivala | |

FOREIGN PATENT DOCUMENTS

| | | |
|---|---|---|
| EP | 3402164 | 11/2018 |
| WO | 01/69888 A1 | 9/2001 |
| WO | WO 2006/059195 | 6/2006 |
| WO | WO 2009/141493 | 11/2009 |
| WO | WO 2014/048236 | 3/2014 |
| WO | WO 2014/114354 | 7/2014 |
| WO | WO 2014/190177 | 11/2014 |
| WO | WO 2015/065913 | 5/2015 |

OTHER PUBLICATIONS

Examination Report corresponding to GB 1901414.1 dated Aug. 19, 2020.
Examination Report corresponding to GB 1901414.1 dated Apr. 16, 2021.
International Search Report and Written Opinion corresponding to PCT/GB2020/050042 dated Mar. 23, 2020.
International Preliminary Report on Patentability corresponding to PCT/GB2020/050042 dated Aug. 12, 2021.
Combined Search and Examination Report corresponding to GB 1901417.4, dated Aug. 1, 2019.
Examination Report corresponding to GB 1901417.4, dated Aug. 13, 2020.
Examination Report corresponding to GB 1901417.4 dated Dec. 22, 2020.
International Preliminary Report on Patentability corresponding to PCT/GB2020/050044, dated Aug. 12, 2021.
International Search Report and Written Opinion corresponding to PCT/GB2020/050044, dated Mar. 23, 2020.
Open Mobile Alliance, "Lightweight Machine to Machine Technical Specification: Core", Version 1.1, published Jun. 12, 2018, OMA, dated Jul. 2019.
Combined Search and Examination Report corresponding to GB 1513748.2 dated Mar. 17, 2016.
Application and File history for U.S. Appl. No. 15/226,523, filed Aug. 2, 2016. Inventors: Sasin et al.
Application and File history for U.S. Appl. No. 14/842,065, filed Sep. 1, 2015. Inventors: Sasin et al.
"Public Key Infrastructures and Digital Certificates for the Internet of Things", Schukat et al. 26th Irish Signals and Systems Conference (ISSC), pp. 1-5, IEEE, Jun. 24-25, 2015.
"Security for IoT." An Effective DTLS with public certificates, Panwar et al., 2015 International Conference on Advances in Computer Engineering and Applications (ICACEA), pp. 163-166, IEEE, Mar. 19-20, 2015.
Search Report dated Jan. 12, 2015 for GB Application No. 1415562.6.
Examination Report dated Jul. 12, 2018 for Application No. GB 1806259.6.
Application and File history for U.S. Appl. No. 17/310,332, filed Jul. 28, 2021. Inventors: Saarnivala et al.

* cited by examiner

TEMPLATE-BASED REGISTRATION OF DEVICES

The present techniques generally relate to registration of devices with a server, such as a server at a device management platform.

There are ever increasing numbers of devices within the home, other buildings or the outdoor environment that have processing and communication capabilities which allow them to communicate with other entities (e.g. devices, servers, services etc.) within the same network or on a different network (e.g. on the internet) to access servers or services as part of the "Internet of Things" (IoT)

For example, a temperature device in a home may gather sensed data and push the sensed data to a remote service (such as an application running in 'the cloud'). The temperature device may then be controlled remotely by the remote service via received command data.

In other examples, a pollution monitoring device in a factory may comprise a sensor to gather information from various chemical sensors and arrange maintenance based on the gathered information; whilst a healthcare provider may use devices comprising sensors, such as a heart rate monitor to track the health of patients while they are at home.

Data is generally transmitted between devices and other entities using machine-to-machine (M2M) communication techniques, and the present applicant has recognised the need for improved (M2M) communication techniques.

According to a first technique there is provided a computer implemented method comprising: receiving, at a first server, one or more device identifiers from a device; determining, with the first server, the availability of a resource template for the device based on or in response to the one or more device identifiers; when the resource template for the device is available: provisioning, from the first server to the device, a template identifier to enable the device to register with a second server using the template identifier.

According to a first technique there is provided computer implemented method for generating a resource template, the method performed by a server or service, the method comprising: determining the availability of a resource template for a device type in storage at the device management platform; determining whether the resource template should be generated responsive to a determination that the resource template is unavailable; generating the resource template responsive to a determination that the resource template should be generated.

According to a first technique there is provided a computer implemented method performed by a device comprising: transmitting, to a first server, one or more device identifiers; receiving, from the first server, a template identifier for a resource template corresponding to the one or more device identifiers; transmitting, to a second server, a registration request comprising the template identifier to enable the second server register the device using the corresponding resource template.

According to a first technique there is provided a computer implemented method performed by a device comprising: transmitting, to a first server, one or more device identifiers; receiving, from the first server, instructions to cause a second server to generate a resource template; transmitting, to the second server, the instructions and the one or more device identifiers to cause the second server to generate the resource template based on or in response to the one or more device identifiers.

According to a first technique there is provided a computer implemented method comprising: receiving, at a server, one or more device identifiers from a device; provisioning, from the server to the device, a template identifier corresponding to a resource template for a subset of resources at the device; receiving, at the server from the device, a registration request comprising the template identifier and identifiers for one or more further resources to enable the second server register the device using the corresponding resource template and the one or more further resources.

According to a first technique there is provided a computer implemented method comprising: receiving, at a first server, one or more device identifiers from a device; determining, with the first server, the availability of a resource template for the device based on or in response to the one or more device identifiers; when the resource template for the device is not available: generating, with the first server, the resource template the device based on or in response to the one or more device identifiers; making the resource template for the device available for a second server or a device.

According to a first technique there is provided a system comprising: a device; and a server; wherein the server is to receive, from the device, one or more device identifiers; determine, the availability of a resource template for the device based on or in response to the one or more device identifiers; when the resource template for the device is available: provision, on the device, a template identifier to enable the device to register with a second server using the template identifier.

The techniques are diagrammatically illustrated, by way of example, in the accompanying drawings, in which.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. It should also be noted that directions and/or references, for example, such as up, down, top, bottom, and so on, may be used to facilitate discussion of drawings and are not intended to restrict application of claimed subject matter.

Figure 1:
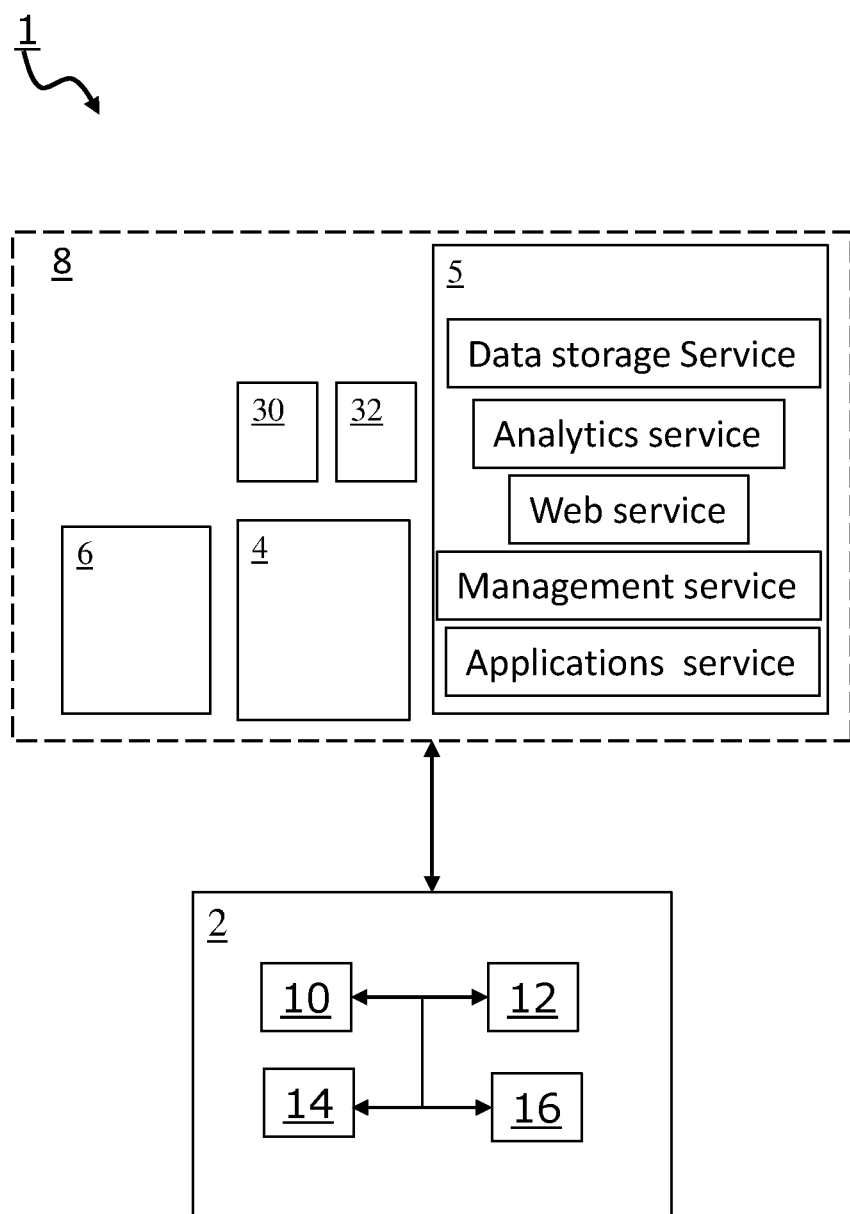
FIG. 1 shows an example deployment scenario for a device according to the present techniques.

FIG. 1 shows a deployment scenario 1 for a device 2 according to the present techniques.

Device 2 may be a computer terminal, a laptop, a tablet or mobile-phone, or may, for example, be a lightweight M2M (LwM2M) device running a LwM2M client. Device 2 can be used to provide smart functionality for streetlights, electric meters, temperature sensors, building automation, healthcare, and a range of other market segments as part of the IoT. It will be appreciated that the examples of market segments listed above are for illustrative purposes only and the claims are not limited in this respect.

Device 2 is operable to communicate with one or more servers and/or services.

As described herein a server (depicted in FIG. 1 as "server 4", "server 6") may be a single computing device or software running on a computing device. However, the claims are not limited in this respect and the server may comprise a plurality of interconnected computing devices (or software running on a plurality of interconnected devices), whereby the plurality of interconnected computing devices may be distributed over one or more public and/or private networks In the present figures server 4 may, for example, be a LwM2M server, an application server, an edge server, a computer terminal, a laptop, a tablet or mobile-phone, or an application hosted on a computing device, and which provides deployment of one or more services (depicted in FIG. 1 as "service 5"). Such services may include one or more of: web service(s); data storage service; analytics service(s); management service(s) and application service(s), although this list is not exhaustive.

In the present figures server 6 comprises a bootstrap server which is used to provision resources at the device 2. In embodiments, bootstrap server 6 may be any type of server or remote machine and may not necessarily be a dedicated bootstrap server. Generally speaking the bootstrap server 6 is any means suitable to perform a bootstrap process with the device 2 (e.g. machine, hardware, technology, server, software, etc.).

In the present examples, the server 4, bootstrap server 6 and/or services 5 are depicted as being part of a device management platform 8, such as the Pelion™ device management platform from Arm®, Cambridge, UK.

The device 2 comprises communication circuitry 10 for communicating with the one or more servers 4 and/or services 5.

The communication circuitry 10 may use wireless communication such as, for example, one or more of: Wi-Fi; short range communication such as radio frequency communication (RFID); near field communication (NFC); communications used in wireless technologies such as Bluetooth®, Bluetooth Low Energy (BLE); cellular communications such as 3G or 4G; and the communication circuitry 10 may also use wired communication such as a fibre optic or metal cable. The communication circuitry 10 could also use two or more different forms of communication, such as several of the examples given above in combination.

It will be appreciated that the device 2 could also use any suitable protocols for communications including one or more of: IPv6, IPv6 over Low Power Wireless Standard (6LoWPAN®), Constrained Application Protocol (CoAP), Message Queuing Telemetry Transport (MQTT), Representational state transfer (REST), HTTP, WebSocket, ZigBee®, Thread® although it will be appreciated that these are examples of suitable protocols.

As an illustrative example, CoAP defines the message header, request/response codes, message options and retransmission mechanisms, such as, for example, RESTful Application Programming Interfaces (APIs) on resource-constrained devices and supports the methods of GET, POST, PUT, DELETE, which can be mapped to methods of the HTTP protocol.

M2M communications are typically required to be secure to reduce the risk that malicious third parties gain access to the data, or to limit the access to data, by devices, servers or services. The device may use one or more security protocols to establish a communications path or channel for providing secure communications between entities. Exemplary security protocols may, for example, comprise Transport Layer Security (TLS) and Datagram Transport Layer Security (DTLS), whereby TLS/DTLS may be used to establish a secure channel between the device 2 and server 4 whereby TLS/DTLS include establishing communications using, certificates (e.g. X.509 certificates) and both pre-shared key and public key technology. The data (e.g. credential data) protected by TLS/DTLS may be encoded as plain text, binary TLV, JSON, CBOR, or any other suitable data exchange format.

The device 2 further comprises processing circuitry 12 for controlling various processing operations performed by the device 2.

The device 2 may further comprise input/output (I/O) circuitry 14, such that the device 2 can receive inputs (e.g. user inputs, sensor inputs, measurement inputs etc.) and or generate outputs (e.g. audio/visual/control commands etc.).

The device 2 further comprises storage circuitry 16 for storing resources, such as credential data, whereby the storage circuitry 16 may comprise volatile and/or non-volatile memory.

Such credential data may include one or more of: certificates, cryptographic keys (e.g. shared symmetric keys, public keys, private keys), identifiers (e.g. direct or indirect identifiers) whereby such credential data may be used by the device to authenticate (e.g. connect, establish secure communications, register, enroll etc.) with one or more remote entities (e.g. a bootstrap server/server/services).

Figure 2A:
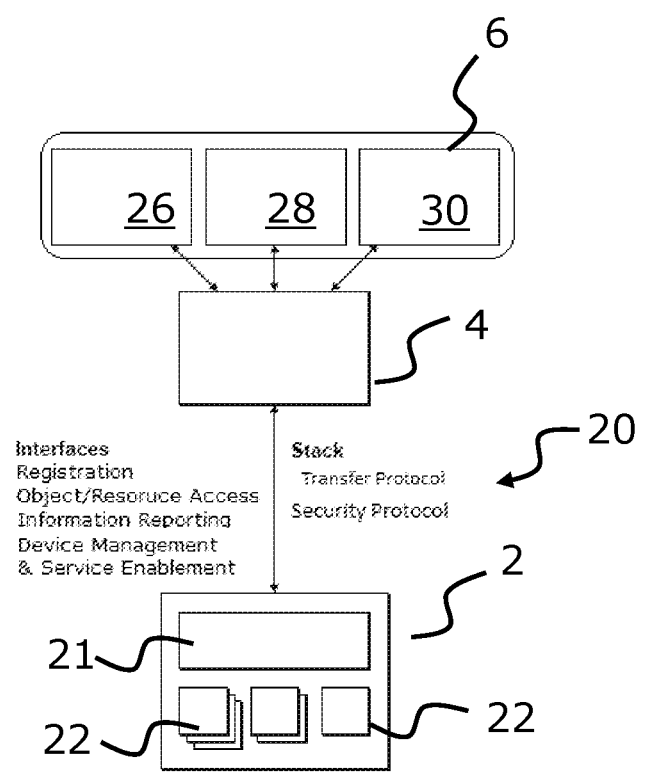
FIG. 2a shows an example architecture depicting a client-server relationship between the device of FIG. 1 and a server.
Figure 2B:
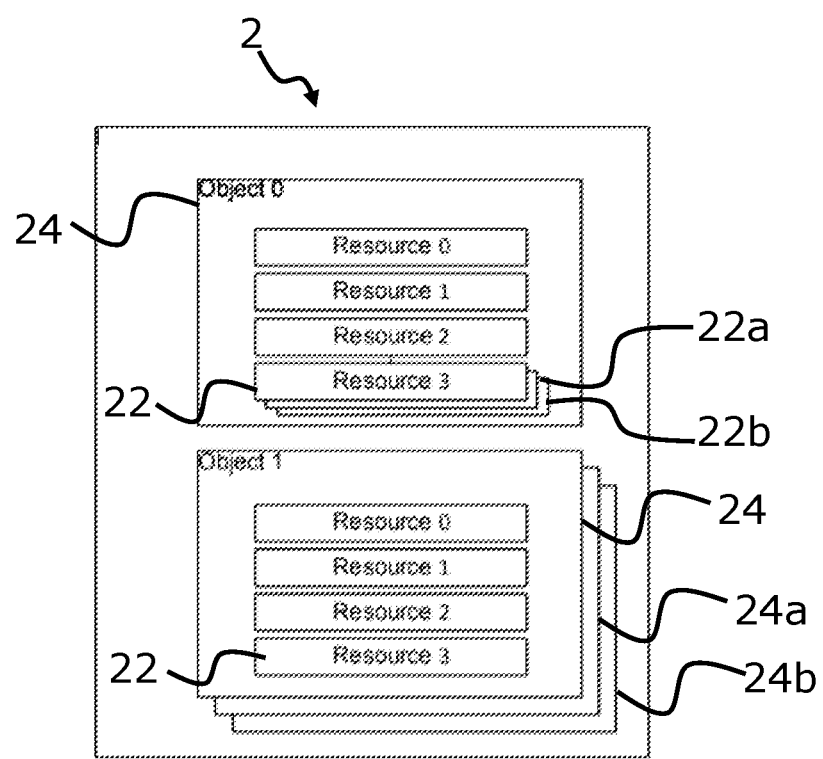
FIG. 2b shows a schematic diagram of an object model on the device of FIG. 1.

FIG. 2a illustratively shows an example architecture 20 which illustrates a client-server relationship between the device 2 and server 4. FIG. 2b illustratively shows a schematic diagram of an object model of device 2.

Device 2 is hereafter referred to as "client device" but may also be referred to herein as a 'device', 'node device', 'node', 'end-user device' or 'user device'.

In the following examples the server 4 is depicted as a LwM2M server, such that the LwM2M server 4 and client device 2 communicate using suitable protocols, such as those in compliance with the Open Mobile Alliance (OMA) LWM2M specification although the claims are not limited in this respect.

The client device 2 comprises client 21 which may be integrated as a software library or a built-in function of a module and which is used in communications with the LwM2M server 4. The client 21 may be an LwM2M client.

Logical interfaces may be defined between the client 21 and LwM2M server 4, and three logical interfaces are depicted in FIG. 2, namely:

'Client Registration' interface may be used to perform and maintain registration with one or more LwM2M servers and de-register from one or more LwM2M servers.

'Device management and service enablement' interface may be used by one or more servers to access object(s), object instances and resources available at the client device 2.

'Information Reporting' interface may be used to enable one or more servers to observe any changes in a resource on client device 2, and for receiving notifications when new values are available.

This list of logical interfaces is exemplary only and additional, or alternative, logical interfaces between the client 21 and LwM2M server 4 may be provided, for example, in accordance with the OMA LwM2M specification.

The device 2 comprises various resources 22, which can be read, written, executed and/or accessed by the LwM2M server 4 or one or more further servers/services.

As an illustrative example, a resource may comprise a value (e.g. generated by circuitry on the device). A web application may, via LwM2M server 4, request the value from the client device 2 (e.g. with a REPORT request), whereby the requested value is read and reported back to the web application by the LwM2M server 4.

As a further illustrative example, a resource may comprise credential data provisioned at manufacture (e.g. during a factory provisioning process) or during a communication session with a bootstrap server, and subsequently used to register with the LwM2M server 4.

As depicted in FIG. 2b, the resources 22 may be further logically organized into objects 24, whereby each device 2 can have any number of resources, each of which is associated with a respective object 24.

A set of objects on client device 2 may include, for example:
- A 'security object' to handle security aspects between the client device 2 and one or more servers;
- A 'server object' to define data and functions related to a server;
- An 'access control object' to define for each of one or more permitted servers the access rights the one or more servers have for each object on the client device 2;
- A 'device object' to detail resources on the client device 2. As an example, the device object may detail device information such as manufacturer, model, power information, free memory and error information;
- A 'connectivity monitoring object' to group together resources on the client device 2 that assist in monitoring the status of a network connection;
- A 'firmware update object' enables management of firmware which is to be updated, whereby the object includes installing firmware, updating firmware, and performing actions after updating firmware;
- A 'location object' to group those resources that provide information about the current location of the client device 2;
- A 'connection statistics object' to group together resources on the client device 2 that hold statistical information about an existing network connection.

In embodiments device 2 may have one or more instances of an object, three of which are depicted as 24, 24a and 24b in FIG. 2b. As an illustrative example, a temperature sensor device may comprise two or more temperature sensors, and the client device 2 may comprise a different device object instance for each temperature sensor.

In embodiments a resource may also comprise one or more resource instances which are depicted as 22, 22a, 22b in FIG. 2b.

In embodiments the objects, object instances, resources and resource instances are organised in an object hierarchy where each of the objects, object instances, resources and/or resource instances are elements of the object hierarchy, and whereby the device can enumerate the different elements of an object instance hierarchy using one or more characters (e.g. a text string; alphanumeric text, binary etc.)

Figure 2C:
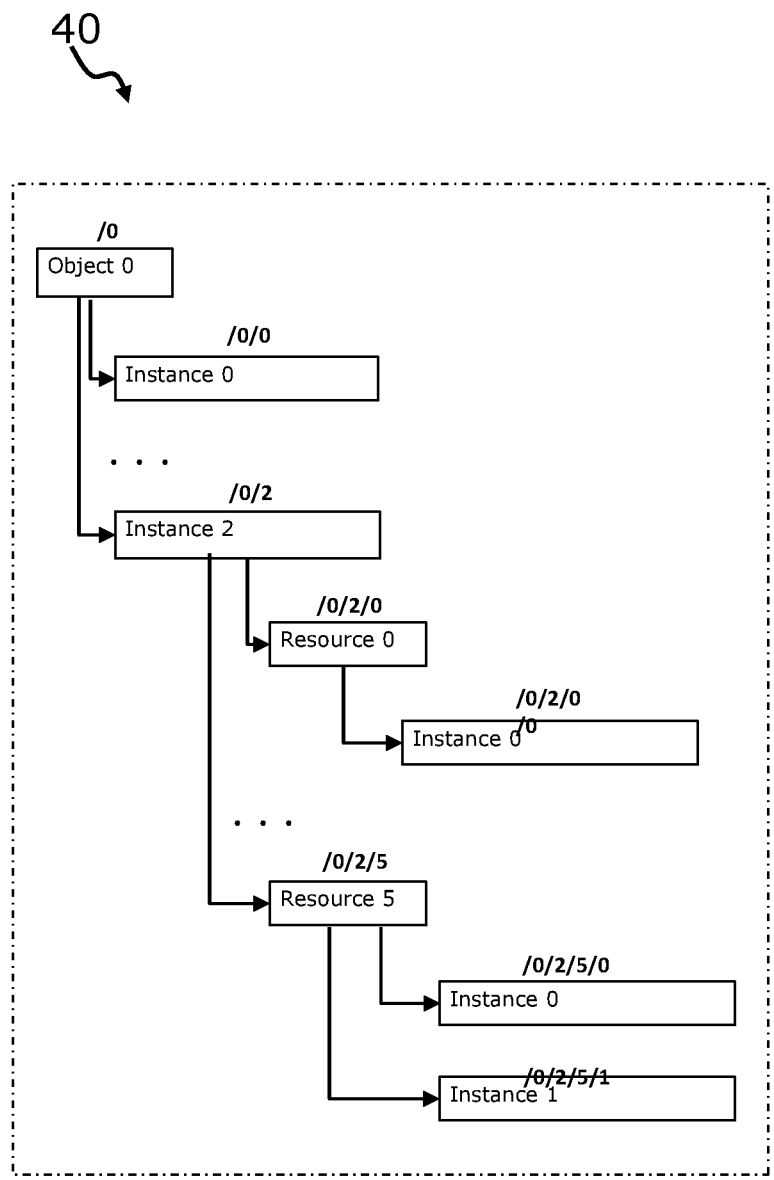
FIG. 2c shows one simplified example of a portion of an object hierarchy.

FIG. 2c shows one simplified example of a portion of such an object hierarchy 40, with omissions marked by elision marks ( . . . ). In FIG. 2c, object 0 instance 2 is shown as having a single instance of resource 0 (that is, resource 0 instance 0), and two instances of resource 5 (that is, resource 5 instance 0 and resource 5 instance 1). The elements of the hierarchy are further marked with a hierarchy notation showing the levels and elements within levels using a slash separator. It will be clear to one of ordinary skill in the art that this is merely one example of a hierarchy notation and is not intended to limit the structure of the hierarchies available using the present techniques. It will also be clear to those of skill in the art that real-world implementations of such hierarchies will be much larger, and that only a very simple example has been shown here.

In the hierarchy shown in FIG. 2c, an object may represent an LwM2M object. Instances of such objects are created according to the requirements of the system being implemented. Thus, for example, in a system for monitoring heating and cooling in a group of buildings, a Temperature object may be defined having instances for each of the buildings. The Temperature object instances may be defined to comprise resources, such as a Current Temperature resource, a Maximum Temperature resource and a Minimum Temperature resource, and each resource may further comprise instances for various temperature sensors.

On registration with a server, a device may then enumerate those elements of an object hierarchy which are to be registered using a suitable identifier, such as a universal resource indicator (URI), in the form:
/{Object ID}/{Object Instance}/{Resource ID} e.g. /3/0/1.

As such, the objects, object instances & resources on a client device may be remotely accessed/managed by, for example, software hosted on a server (e.g. a bootstrap server, LwM2M server 4) or an application running as part of a service 5.

In an embodiment the LwM2M server 4 comprises, or has access to a resource directory (depicted as resource directory 30 in FIG. 1) at the device management platform 8 (as depicted in FIG. 1), whereby the resources of the various client devices registered with the LwM2M server 4 are stored in the resource directory 30.

Thus, the resource directory 30 is a registry of the elements of the object hierarchy on one or more client devices registered with one or more servers. In embodiments the resource directory 30 may be realized using a processor and a storing device such as a hard disc drive and a suitable application, a database application in a computer or it may be realized using cloud computing.

In an embodiment client device 2 registers with a LwM2M server 4 by sending a registration request and providing various data (e.g. in a TLS/DTLS handshake), such as providing all of the objects, object instances resources, and/or resource instances thereat (e.g. as a text string or individual identifiers). The LwM2M server 4 stores the identified objects, object instances, resources and/or resource instances in the resource directory 30 for the client device 2. Once the data is in the resource directory 30 the data can then be looked up and resources accessed as required.

As the number of objects, object instances, resources and/or resource instances on a client device increases, the size of the registration message will also increase and may impact the system capacity, especially when many client devices attempt to register with the LwM2M server 4 at substantially the same time.

To simplify the registration procedure and reduce the size of the registration request from a particular client device, the LwM2M server may use template-based registration, whereby the LwM2M server accesses resource templates which define objects, object instances, resources and/or resource instances for a particular device type. A resource template is a template of at least two pre-determined objects, object instances, resources and/or resource instances. In embodiment a resource template is associated with a device type.

In the present specification, the "device type" is defined by the objects, object instances and resources on a client device, whereby client devices of the same device type will have the same objects, object instances and resources, whilst client devices of a different device type will have different objects, object instances and resources. Moreover, the objects, object instances and resources may have different values on each device. As an illustrative example, a first client device having a first set of resources will be a different client device type to a second client device having a second set of resources, the second set of resources having at least one additional or alternative resource than the first set of resources.

Referring again to FIG. 1, resource templates may be stored in storage 32 on the device management platform 8, hereafter "template storage" 32.

In an illustrative example, when a client device 2 registers with the LwM2M server 4 and the objects, object instances, resources and/or resource instances at that client device 2 match the objects, object instances, resources and/or resource instances specified in a resource template in template storage 30, the LwM2M server 4 can store the objects, object instances, resources and/or resource instances identified in the resource template in the resource directory 30 to register that client device 2 at the device management platform 8.

In such a scenario the client device 2 can identify the resource template by providing a template identifier in the registration request, where the template identifier may be provisioned on the client device 2 by bootstrap server 6 during a bootstrap process. Such functionality means that the client device 2 is not required to provide all of its objects, object instances, resources and/or resource instances to the LwM2M server 4, rather it just transmits a template identifier to provide for template-based registration.

The present techniques provide for the device management platform to determine whether a resource template is available for a client device, and to generate resource templates when appropriate.

Figure 3:
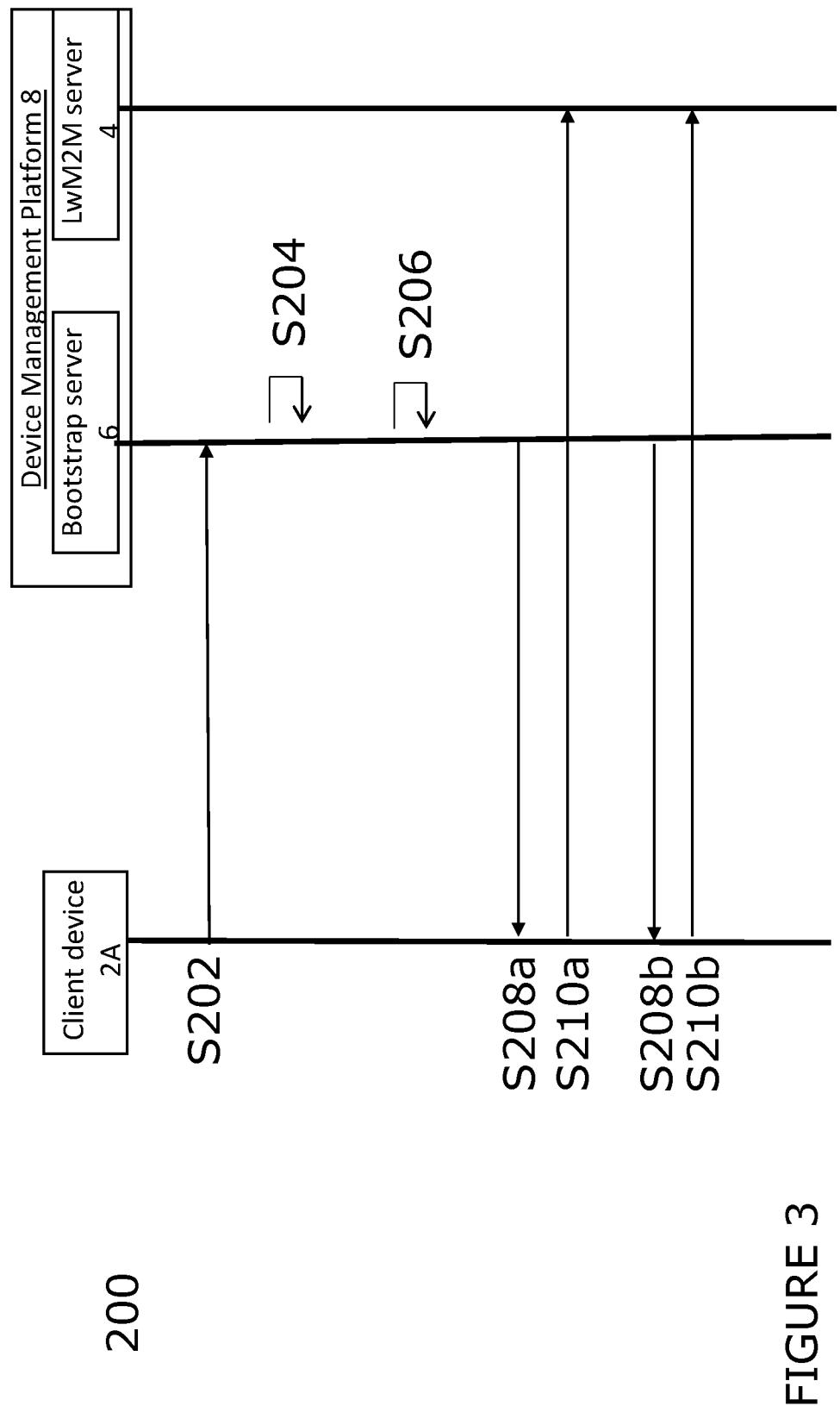
FIG. 3 shows an example of a bootstrap process between a device and a server.

FIG. 3 shows an illustrative example of a bootstrap process 200 between client device 2A and bootstrap server 6, to enable the bootstrap server 6 to determine whether a resource template is available for client device 2A.

At S202 client device 2A provides one or more device identifiers to the bootstrap server 6, such that the bootstrap server 6 determines the device type of client device 2A based on or in response to the device identifiers. The device identifiers may be provided to the bootstrap server 6 during a TLS/DTLS handshake to establish a secure communications session, or in one or more messages after secure communications session is established, or a combination of both.

The device identifiers comprise any information to allow the bootstrap server 6 to determine the device type of the client device. Such device identifiers may, for example, include one or more of: a manufacturer identifier; a manufacturer hardware identifier; a device class identifier; a firmware version identifier; a security identifier; and a communication type identifier.

It will be appreciated that this list provides illustrative examples, and any suitable device identifier(s) may be used.

At S204 the bootstrap server 6 determines whether a resource template for the device type is available and at S206 determines whether one or more LwM2M servers have access to that resource template. In embodiments, to determine whether the device type is available the bootstrap server may query template storage (not shown in FIG. 3), or the bootstrap server 6 may have previously generated a resource template for the same device type and provided it to the device management platform.

At S208a, when the resource template is available to LwM2M server, the bootstrap server provisions client device 2A with credential data and template identifier to enable the device to, at S210a, transmit a registration request to the LwM2M server 4. The registration request will include the template identifier to enable the LwM2M server 4 store the objects, object instances and/or resources of the identified resource template in the resource directory.

At S208b, when the resource template is not available to LwM2M server, the bootstrap server provisions client device 2A with credential data to enable the device to, at S210b, transmit a registration request to the LwM2M server to identify all objects, object instances and/or resources thereon, so LwM2M server 4 can store the resources in the resource directory. The registration request at S210b may comprise the identifiers for the respective objects, object instances and/or resources.

It will be appreciated that the registration request comprising a template identifier at S210a will be smaller in size than the registration request identifying all resources at S210b. As such, providing the template identifier in the registration request reduces the size/number of packets of the registration request in comparison to when the resource template is not available to the LwM2M server 4.

Embodiments of the present techniques provide for creating new resource templates for a particular device type, whereby the LwM2M server 4, bootstrap server 6, or another server or service may generate the new resource template.

Figure 4:
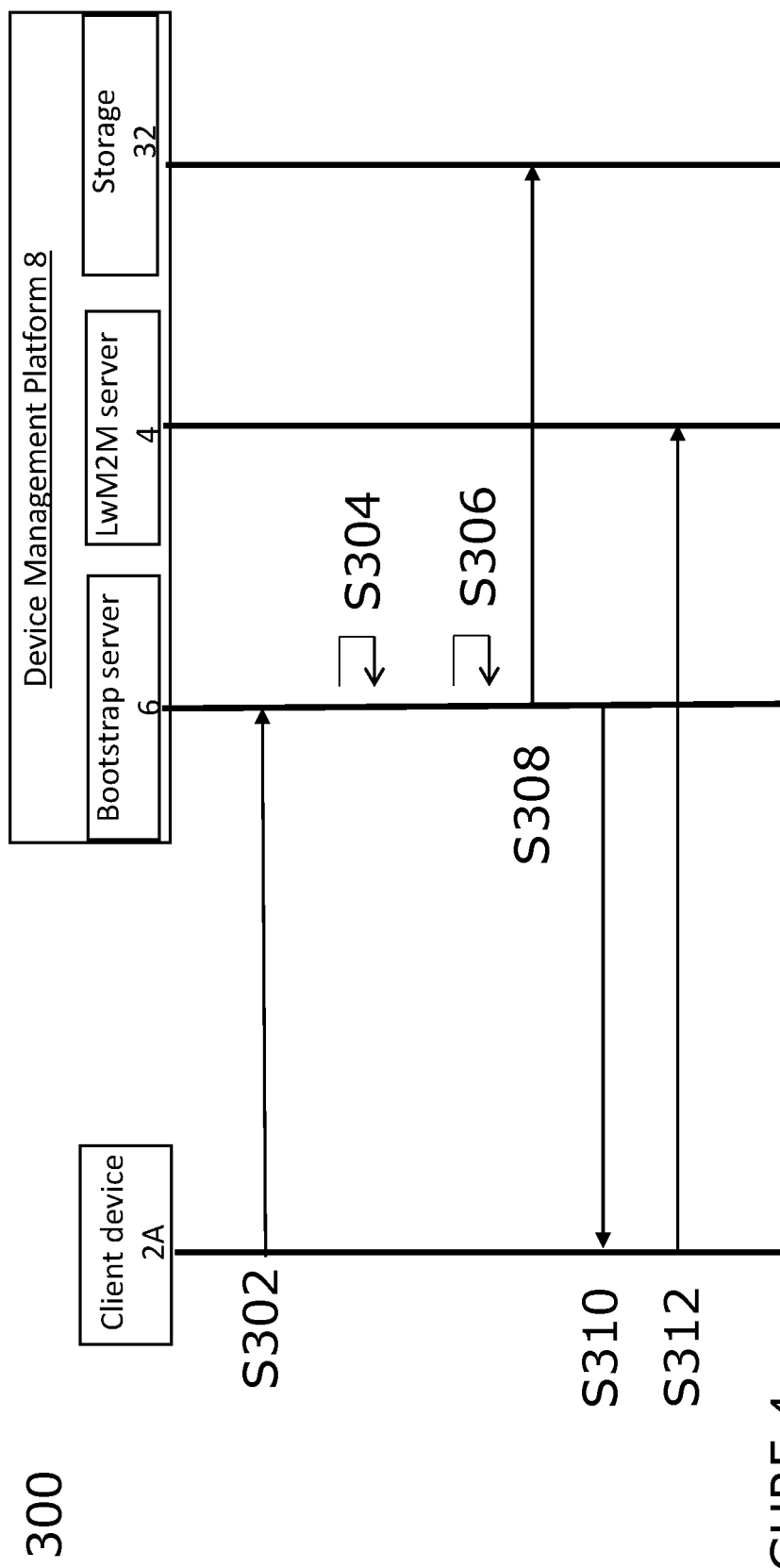
FIG. 4 shows a further example of a bootstrap process between the device and bootstrap server.

FIG. 4 shows an illustrative example of a bootstrap process 300 between client device 2A and bootstrap server 6 to enable the bootstrap server 6 to generate a resource template for client device 2A, whereby at S302 client device 2A provides one or more device identifiers to the bootstrap server 6, such that the bootstrap server 6 determines the device type of client device 2A based on or in response to the one or more device identifiers.

When, at S304 the bootstrap server 6 determines that a resource template for that device type is not available (e.g. not in template storage), the bootstrap server 6, at S306, generates a resource template for the device type and, at S308, stores the resource template in template storage 32.

At S310, the bootstrap server 6 provisions client device 2A with credential data and a template identifier corresponding to the device type of the client 2A to enable a registration request to the LwM2M server at S312 to include the template identifier to enable the LwM2M server 4 to store the resources of the identified resource template in the resource directory.

Such functionality means that a first server (e.g. a bootstrap server) can generate new resource templates for a client device, and make the new resource template available to further server(s) (e.g. a LwM2M server) as well as to a device, such that the size/number of packets in a subsequent registration request from the client device to the further server(s) can be reduced in comparison to when the resource template is not available to the further servers.

Figure 5:
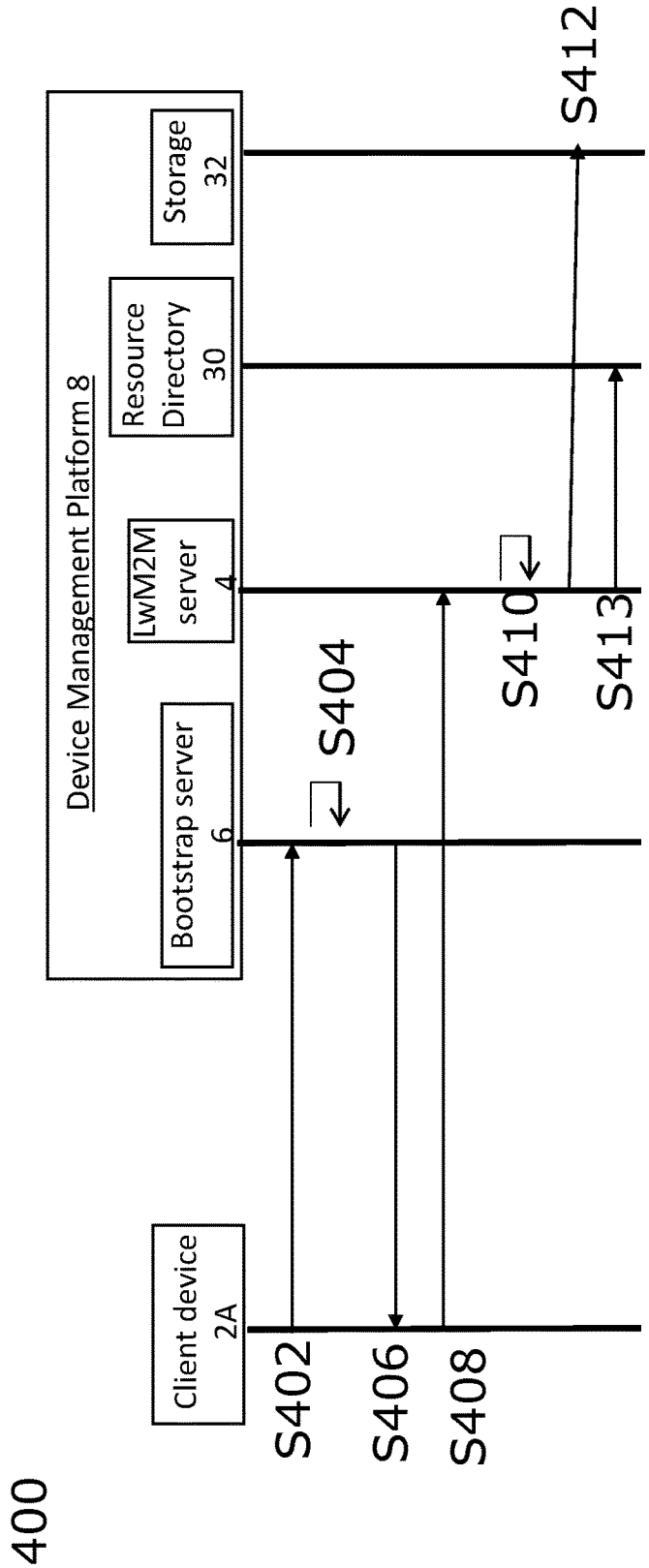
FIGS. 5 & 6 show a further example of a bootstrap process between device and bootstrap server.

FIG. 5 shows an illustrative example of a bootstrap process 400 between client device 2A and bootstrap server 6, whereby at S402 client device 2A provides one or more device identifiers to the bootstrap server 6, such that the bootstrap server 6 determines the device type of client device 2A based on or in response to the device identifiers.

When, at S404 the bootstrap server 6 determines that resource template is not available (e.g. not in template storage), the bootstrap server 6, at S406, provisions client device 2A with credential data and instructions to enable a registration request to the LwM2M server, and whereby the instructions are to cause the LwM2M server 4 (or another entity at the device management platform 8) to generate a resource template for the device type.

At S408, the client device 2A transmits the registration request, along with the instructions, and at S410 the LwM2M server 4 (or another entity) generates a resource template based on or in response to the instructions and at S412 stores the resource template in template storage. The instructions may comprise a flag or a code, whereby the LwM2M server recognises the instructions as a command to generate a resource template. The client device may provide device identifiers as part of the registration process, whereby the resource template is generated based on or in response to the one or more device identifiers.

At S413, the LwM2M server 4 stores the object(s), object instances(s), resource(s) and/or resource instance(s) defined in the generated resource template in the resource directory 30 for the client device 2A.

Such functionality means that a first server (e.g. a bootstrap server) can determine that a resource template for a client device is not available (e.g. not in template storage), and provide instructions to the client device to cause a further server or service to generate the resource template, such that the size/number of packets in a subsequent registration request from the client device or a further client device of the same device type can be reduced in comparison to the initial non template-based registration process by the client device.

Figure 6:
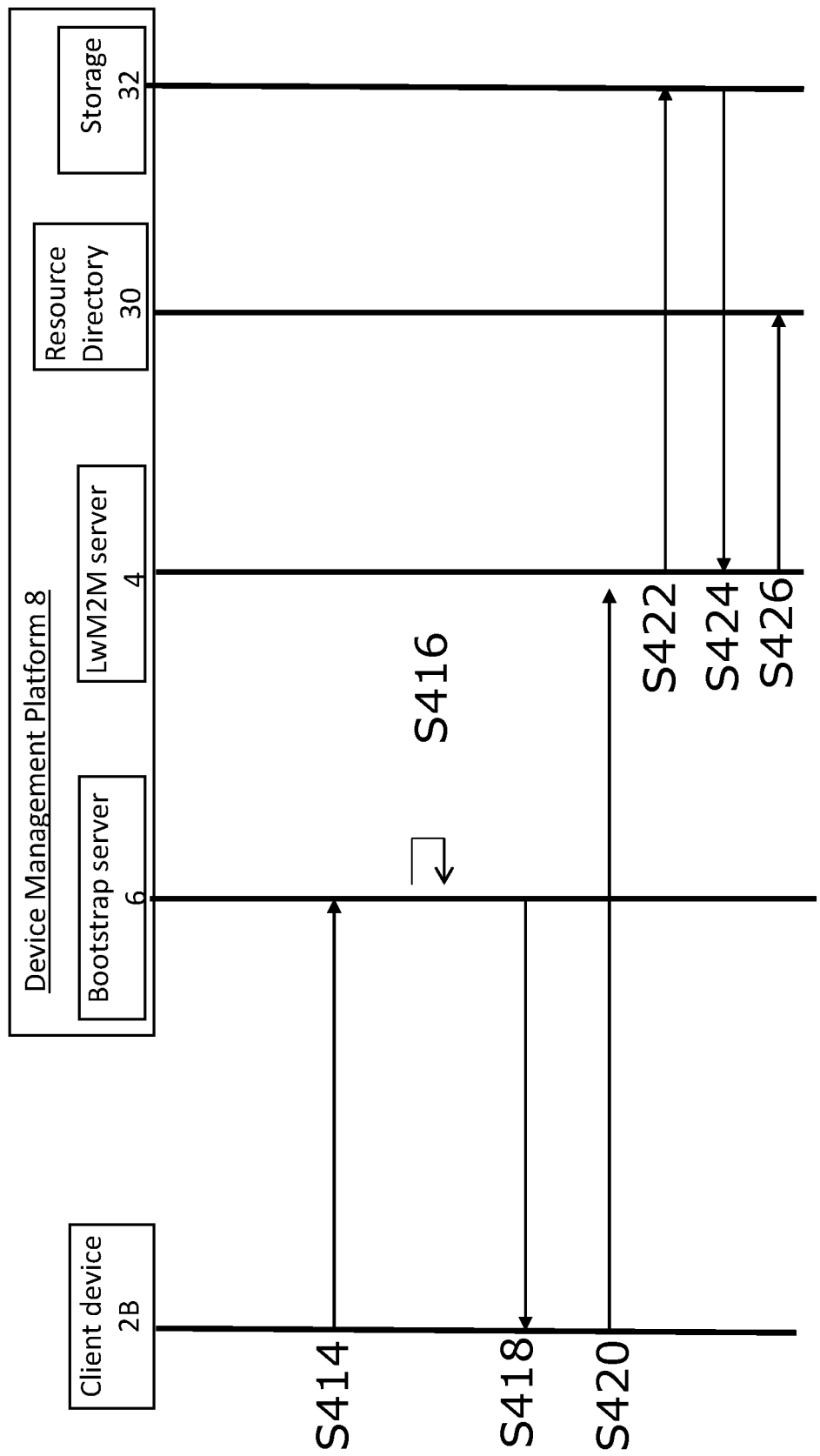

As an illustrative example shown in FIG. 6 (continuing from FIG. 5), at S414 client device 2B, which is the same device type as client device 2A, bootstraps with bootstrap server 6.

At S416, the bootstrap server 6 determines that a resource template is available for client device 2B and at S418 provisions client device 2B with credential data and a template identifier to enable a registration request to the LwM2M server 4 at S420 to include the template identifier. At S422 the LwM2M server 4 requests the resource template corresponding to the template identifier from template storage 32 and at S424 receives the requested resource template from template storage 32.

At S426, the LwM2M server 4 stores the resources of the identified resource template in the resource directory 30 for the client device 2B.

It will be appreciated that the messages transmitted from client device 2B to LwM2M server 4 during the registration process may be reduced in size in comparison to the messages transmitted from client device 2A to LwM2M server 4 during the registration process even though the client devices 2A and 2B are the same device type because the resource template for the device type was available client device 2B, and client device 2B could identify the resource template rather than providing instructions and device identifiers to cause the LwM2M server to generate the resource template.

In embodiments one or more object(s), object instance(s) and resource(s) on a client device may change over time (e.g. following a firmware update), thereby changing the device type of that client device. A server (e.g. bootstrap server or LwM2M server) may generate new templates for a new device type.

Figure 7:
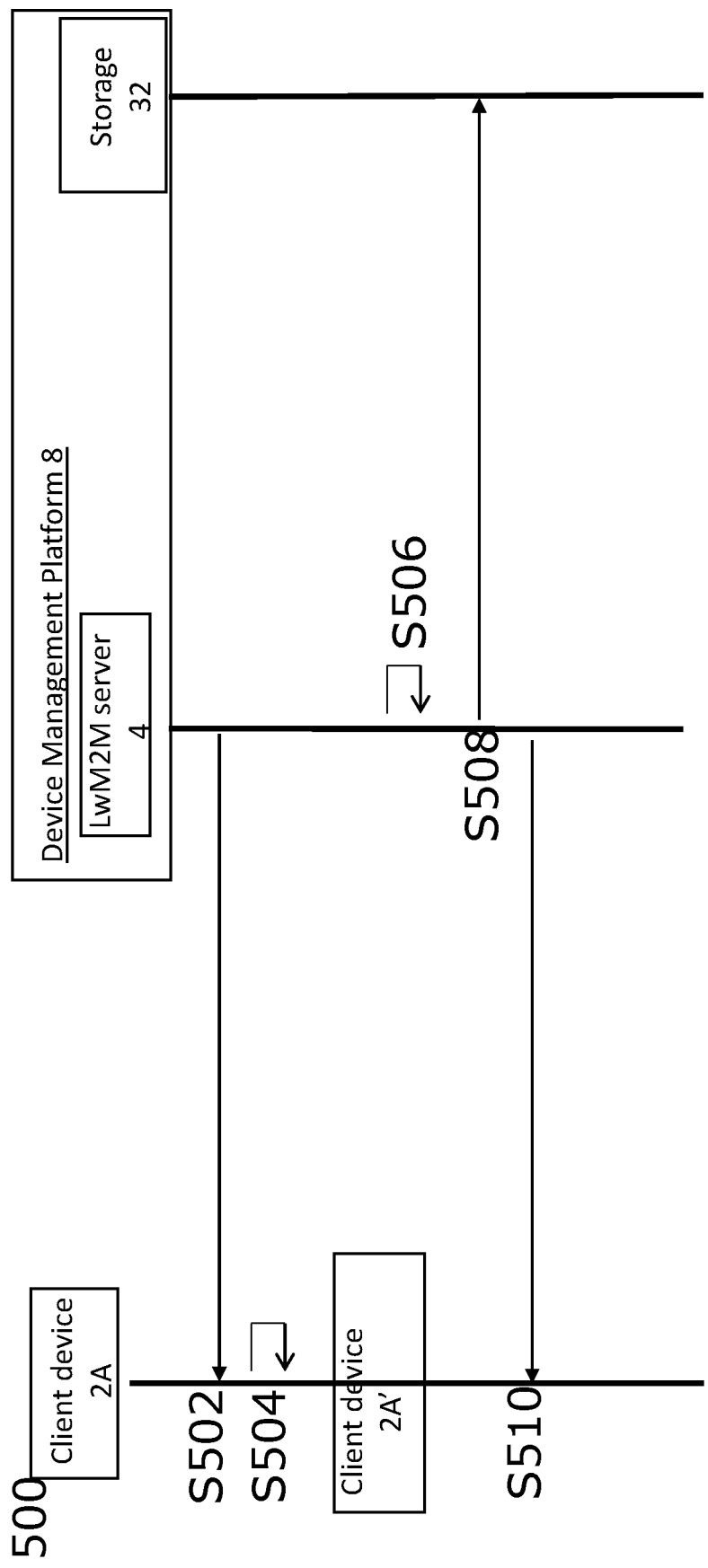
FIG. 7 shows an example process in which a server provisions update data on the device.

FIG. 7 illustratively shows an example process 500 in which, at S502, LwM2M server provisions update data (e.g. a firmware update) on the client device 2A and whereby at S504 client device 2A performs the update to cause one or more resources, and therefore, the device type to change (client device 2A' depicted as being the new device type).

In an embodiment, the LwM2M server 4 may, at S506, generate a new resource template for the device type of client device 2A' and, at S508, store the new resource template in template storage 32. The LwM2M server 4 may, at S510, also store a template identifier for the new resource template on client device 2A' (e.g. as a resource in the firmware object). As such, client device 2A' could use the template identifier in a subsequent registration process with the LwM2M server 4.

Such functionality means that when a client device is updated it can be provisioned with a template identifier for a resource template corresponding to its updated resources, meaning it can use the template identifier in a template-based registration process with a server rather than having to provide its device identifiers/instructions to the server.

Such functionality also means that the resource template will also be available for further client devices of the same device type as client device 2A' when registering with the LwM2M server 4 (or another server/service).

Whilst object(s), object instance(s) and/or resource(s) may change due to updates, some client devices may have different object(s), object instance(s) and/or resource(s) from one session to another.

Whilst a server could generate a new template for every device type, given that trillions of devices are predicted to be used in IoT networks, generating new templates for every new device type may place a burden(s) on the device management platform (e.g. processing, computational and/or storage burdens). As such, the device management platform may determine when a new template should be generated for client devices.

Figure 8:
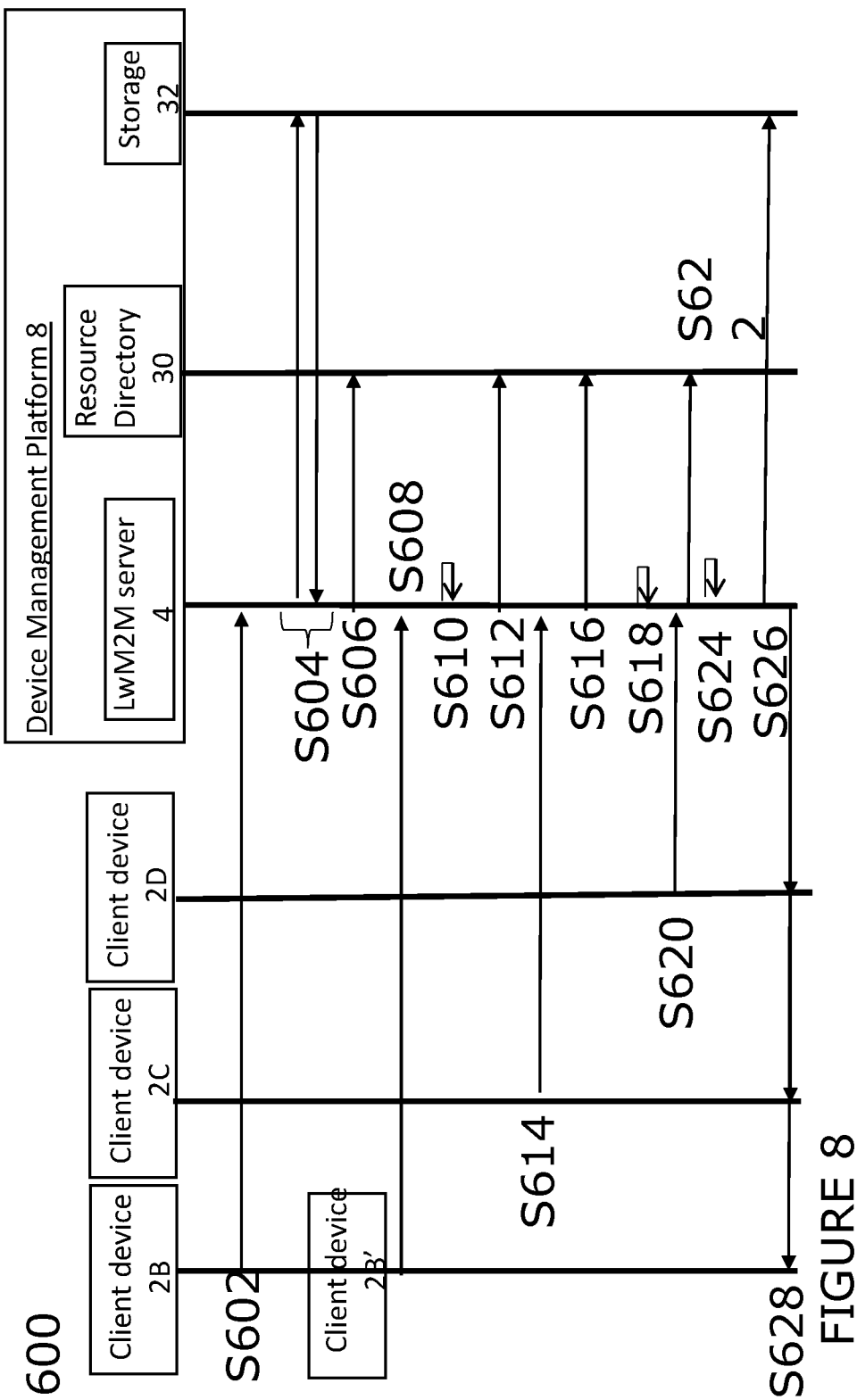
FIG. 8 shows an example process in which an entity on device management platform determines that a new resource template should be generated for a new device type.

FIG. 8 illustratively shows an example process 600 in which LwM2M server 4 determines that a new resource template should be generated for a new device type. In other embodiments one or more of: the bootstrap server 6 and another server or service may perform the process 600.

At S602 client device 2B having a first device type for which there is a resource template available, transmits a registration message to LwM2M server 4 and provides the template identifier to enable LwM2M server 4 to request and obtain the resource template from template storage 32

(depicted at S604) and, at S606, update the resource directory 30 for client device 2B with the resources in the resource template.

Client device 2B is subsequently updated to add/remove/modify one or more of its resources to result in a second device type (depicted as client device 2B'), whereby at S608, client device 2B' registers with the LwM2M server 4, providing resource identifiers to enable the LwM2M server 4 determine that client device 2B is of the second device type.

In the present embodiment, at S610 the LwM2M server 4 determines that the number of client devices of the second device type does not warrant generating a new resource template therefor, and, at S612, the LwM2M server 4 updates the resource directory 30 for client device 2B' with the resources identified during registration.

At S614, client device 2C registers with the LwM2M server 4 providing resource identifiers to enable the LwM2M server 4 determine that client device 2C is of the second device type.

At S616 the LwM2M server 4 updates the resource directory 30 for client device 2C with the resources identified during registration. At S618, LwM2M server determines that the number of client devices of the second device type still does not warrant generating a new resource template therefor.

At S620, client device 2D registers with the LwM2M server 4 providing resource identifiers to enable the LwM2M server 4 determine that client device 2D is of the second device type.

At S622 the LwM2M server 4 updates the resource directory 30 for client device 2D with the resources identified during registration. At S624, LwM2M server determines that the number of client devices of the second device type does warrant generating a new resource template therefor, and at S626 generates a new resource template for the second device type and stores the new resource template in storage 32. At S628 the LwM2M server may provision the template identifier on the client devices of the second device type.

The determination as to whether a new resource template should be generated for a particular device type may, for example, be based on or in response to the number of devices of that particular device type reaching a threshold. Such functionality means that the device management platform can set the threshold so as to dynamically manage any burden placed thereon by client devices registering therewith.

In some embodiments a client device may be provided with a template identifier relating to a subset of the object(s), object instance(s) and/or resource(s) thereon, such that during registration with a server, the client device will provide the template identifier for the subset, and then provide identifiers for the object(s), object instance(s) and/or resource(s) not within that subset so that the server will be aware of all object(s), object instance(s) and/or resource(s) thereon.

Such functionality means that the device management platform can provision, on multiple client devices, a template identifier relating to a resource template covering object(s), object instance(s) and/or resource(s) which may be common to the multiple devices or which may be static.

A client device having different object(s), object instance(s) and/or resource(s) not included within the corresponding resource template can provide identifier(s) for those additional or alternative elements during a registration process with the server.

Figure 9A:
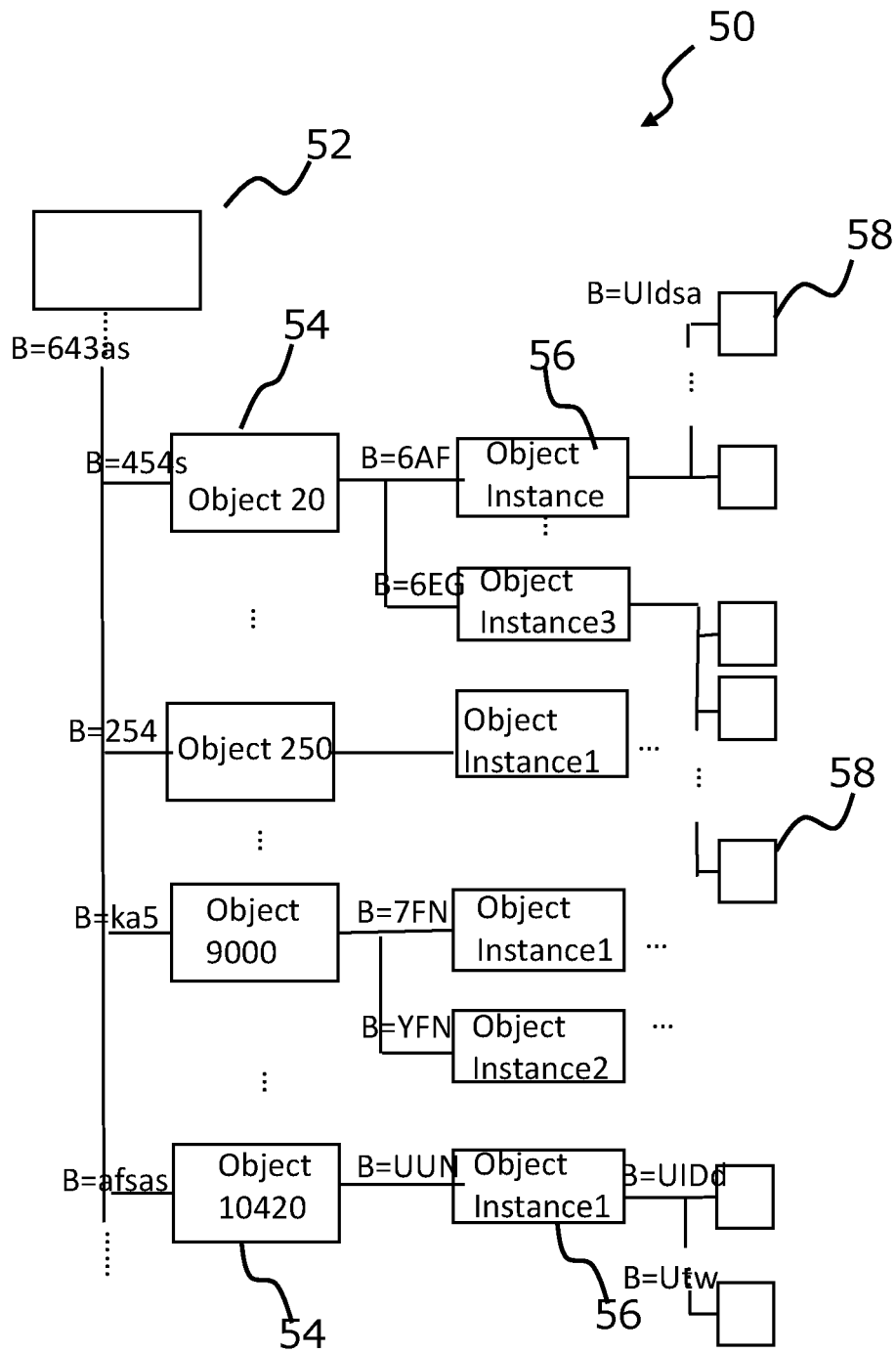
FIGS. 9a and 9b show an example of a data structure representative of all resources available to the device management platform.
Figure 9B:
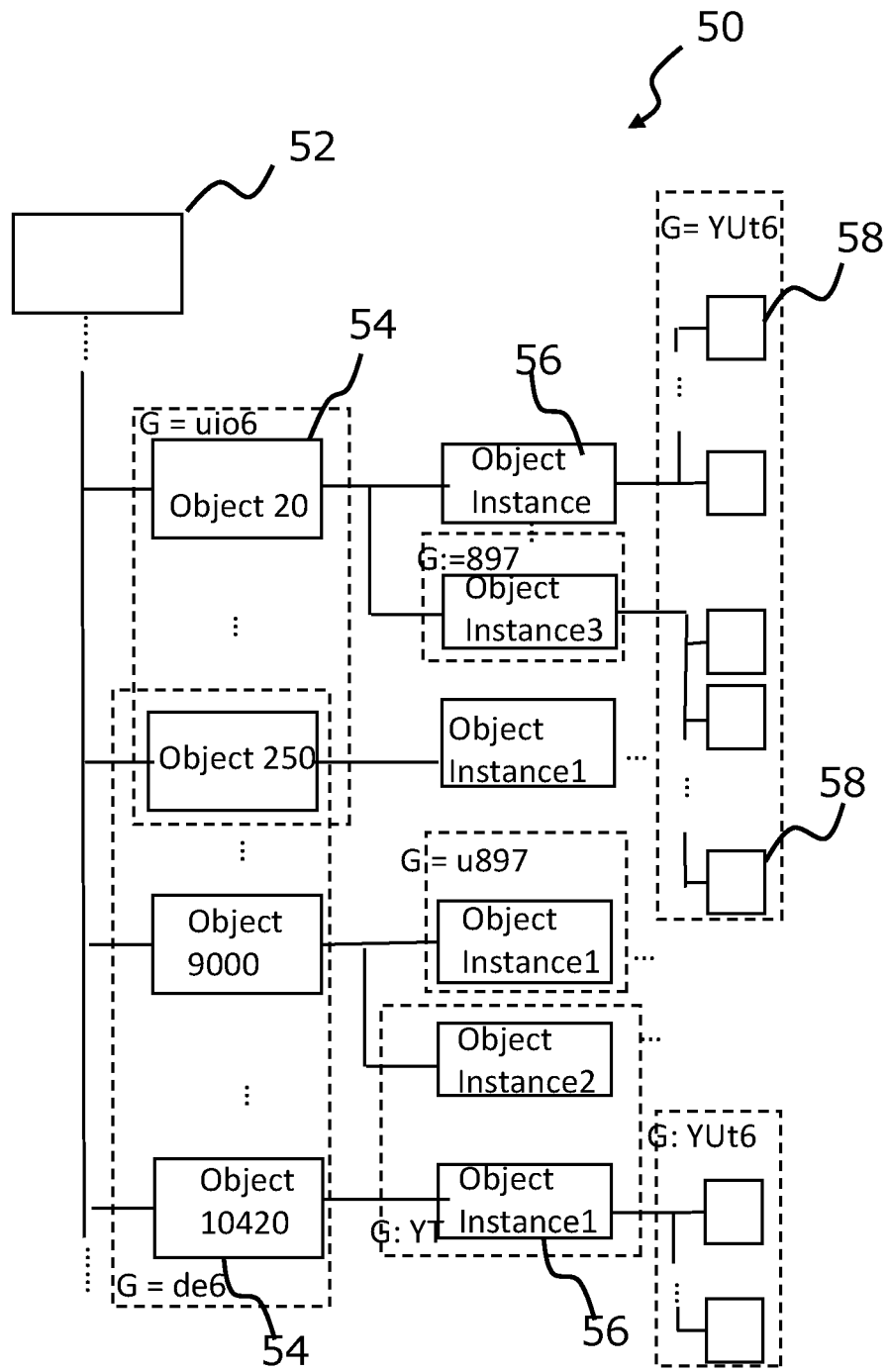

FIGS. 9a and 9b illustratively show an example of a data structure 50 which may be used by the device management platform (e.g. a server or service) to generate resource templates and/or to assign template identifiers to resource templates. Additionally, or alternatively, the data structure may be used to identify which object(s), object instance(s), resource(s) and/or resource instance(s) are within a particular resource template based on or in response to a received template identifier.

As illustratively depicted in FIGS. 9a and 9b, the data structure 50 is representative of all resources available to the device management platform and is structured in a hierarchical manner, whereby the root node 52 represents the set of available resources. In other embodiments the data structure may be representative of a subset of resources available to the device management platform.

Object nodes 54 each represent a subset of the resources of the root node 52.

Object instance nodes 56 each represent a subset of the resources of the respective object nodes 54.

Resource nodes 58 each represent a subset of the resources of the respective object instance nodes 56. A further branch may originate from the respective resource to provide resource instance nodes (not shown in FIG. 9a or 9b).

Each branch of the data structure 50 comprises a group of object(s), object instance(s) and/or resource(s) and is allocated a different group identifier (B). The group identifiers (B) are depicted as being alphanumeric values in FIG. 9a, although the claims are not limited in this respect.

In an embodiment the group identifiers for a branch may be generated by the device management platform (e.g. a server or service thereat) applying a data reducing function to all the resources of the respective nodes of that branch (e.g. by applying the data reducing function to all identifiers of the resources). In an embodiment the data reducing function is a compression function such as run-length encoding (RLE), Huffman encoding and/or Lempel-Ziv compression. In a further embodiment the data reducing function is a hashing function such as MD5, SHA, Adler32 Checksum etc. Such hashing functions may be one-way hashing function.

In an embodiment, when generating a registration message, the client device may generate the group identifiers by performing the same data reducing function on the respective object(s), object instance(s) and/or resource(s) thereon. The group identifiers may then be used as template identifiers in the registration message. Such functionality reduces the size of the registration message as the devices do not have to transmit individual identifiers for all the object(s), object instance(s) and/or resource(s).

In some embodiments the client device may be pre-provisioned with the group identifiers during a bootstrapping process or via a gateway apparatus. Additionally, or alternatively, the client device may be provisioned with a data structure for the object(s), object instance(s) and/or resource(s) thereon and may select the group identifiers to be used as template identifiers from the data structure. Such functionality reduces the computational/processing burden on client devices in comparison to having to generate the respective template identifiers.

Such functionality also means that different client devices can provide different template identifiers in the respective registration messages and the receiving server will determine which object(s), object instance(s) and/or resource(s) are required to register each of the different devices based on or in response to the template identifiers.

As an illustrative example, client devices 2A and 2B could both implement resources identified by group identifiers "B=454s" and "B=afsas" and include these group identifiers as a template identifier in the registration message. Similarly, both client devices could require resources from different sub-branches and include the group identifiers for the different sub-branches in the template identifier.

In a further embodiment object(s), object instance(s) and/or resource(s) available to the device management platform may be grouped together other than by branches of the data structure.

As depicted in FIG. 9b, the object(s), object instance(s) and/or resource(s) in data structure 50 are grouped and identified by a group identifier (G), whereby group identifier "G=uio6" corresponds to all objects from object 20 to object 250; group identifier "G=YT" corresponds to object instances 1 and 2 of object 10420; template identifier "G=u897" corresponds to object instance 3 of object 20 and object instance 1 of object 9000; group identifier "G=uio6" corresponds to all objects from object 250 to object 10420; and template identifier "G=YUt6" corresponds to the resources of object 20 and object 10420. The groups depicted in FIG. 9b are illustrative only and any number or selection of groupings may be assigned. As depicted in FIG. 9b, a group may have one or more overlapping elements with another group.

As above, the group identifiers may be calculated by the device management platform (e.g. a server or service threat) by applying a data reducing function to the resources of the objects, object instances, resources assigned to each group (e.g. by applying the data reducing function to the identifiers of the respective object(s), object instance(s) and/or resource(s)).

As will be appreciated, client devices may generate the respective template identifiers by performing a data reducing function on the respective object(s), object instance(s) and/or resource(s) thereon and use the output of the data reducing function as the template identifier. Such functionality reduces the size of the registration message as the devices do not have to transmit individual identifiers for all the object(s), object instance(s) and/or resource(s).

In other embodiments, the object(s), object instance(s) and/or resource(s) may be assigned to a group based on new device types resulting from future updates. In an embodiment object(s), object instance(s) and/or resource(s) may be assigned to a group based on the frequency the object(s), object instance(s) and/or resource(s) are used to register client devices. For example, the most commonly used object(s), object instance(s) and/or resource(s) can be grouped together.

Such functionality means that multiple client devices can be provided with template identifiers for resource identifiers common to all client devices, whilst the individual devices can customise the registration message to include further groups within the respective template identifiers to indicate the additional or alternative object(s), object instance(s) and/or resource(s) required for registration.

A template identifier in a registration message from a client device may correspond to one or more group identifiers as part of a registration message, and, therefore, a receiving server (e.g. at device management platform) can determine which object(s), object instance(s) and/or resource(s) are required to register the client device based on or in response to the template identifier.

Thus, the data structure provides for a reduction in the computational/processing burden on the device management platform because once the group identifiers are generated, they can be stored and looked-up for each device registration and will not be required to be regenerated until they are updated or modified.

As above, in embodiments one or more object(s), object instance(s) and resource(s) on a client device may change over time (e.g. following a firmware update), thereby changing the device type of that client device. Accordingly, the device management platform may dynamically learn the group identifiers and deliver them to client devices or gateway apparatus in advance of the device type changing. Such dynamic learning may be based on customer/user/administrator input-configurations, device types being connected to the other gateways associated with the customer account, geographical cues etc. although the claims are not limited in this respect.

Whilst the embodiments above generally describe the resource templates being generated at the device management platform, in some embodiments the client device may generate a resource template, and further generate a corresponding template identifier. Such functionality means that when a template identifier is not available at the device management platform, the client device can generate its own template identifier for use in registration with a server.

Figure 10:
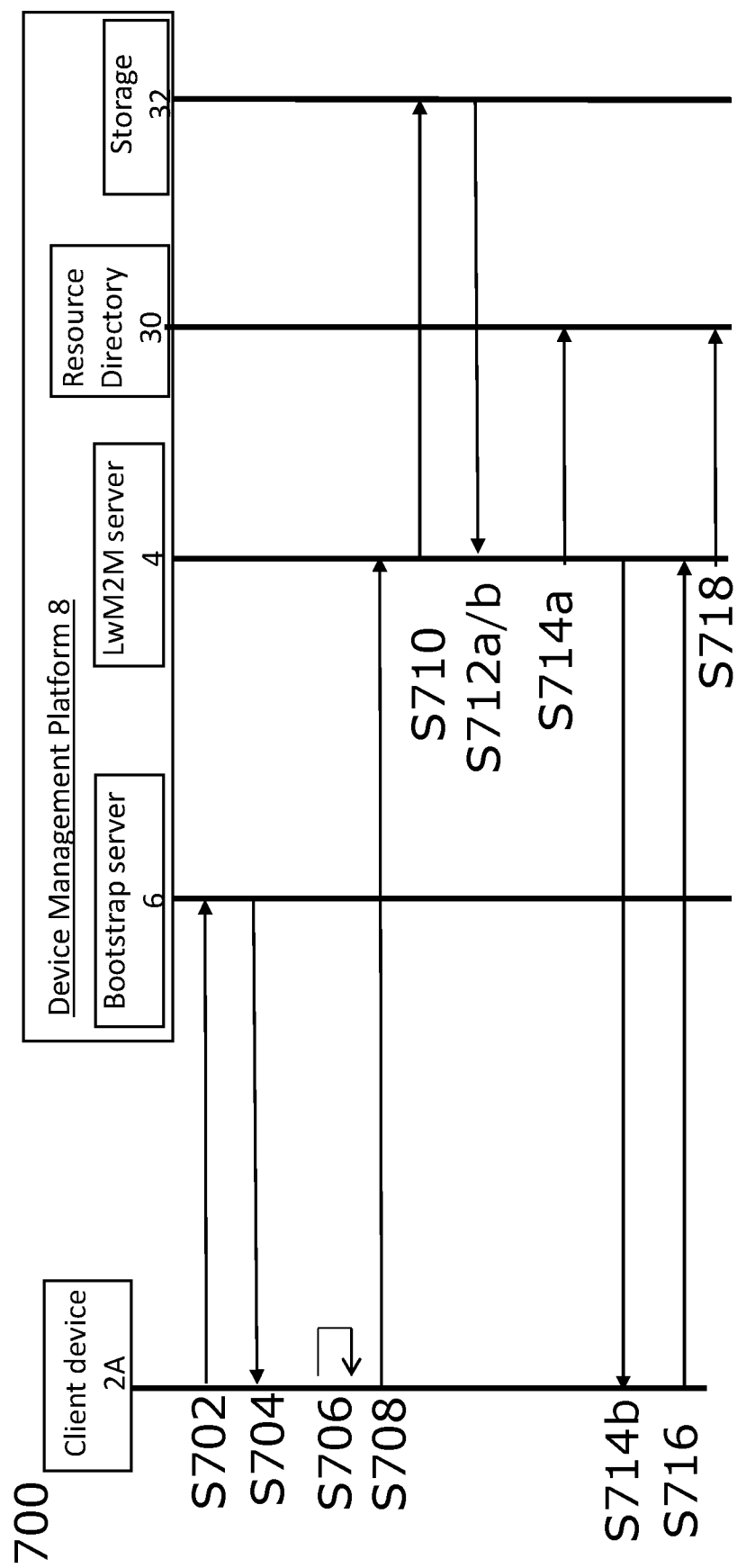
FIG. 10 shows an example process of client device generating a resource template and providing it to the device management platform.

FIG. 10 illustratively shows an example process 700 of client device 2A providing template identifier to the device management platform 8.

At S702 client device 2A bootstraps with bootstrap server 6, and at S704 bootstrap server 6 indicates (e.g. using a flag or instruction) that a resource template is not available for the object(s), object instance(s) and/or resource(s) on the client device 2A.

At S704 the device generates a device template identifier to identify all object(s), object instances and/or resources thereon, whereby in an embodiment the client device 2A may apply a data reducing function to one or more identifiers of the object(s), object instance(s) and/or resource(s) thereon.

In an embodiment the data reducing function is a compression function such as run-length encoding (RLE), Huffman encoding and/or Lempel-Ziv compression. In a further embodiment the data reducing function is a hashing function such as MD5, SHA, Adler32 Checksum etc. Such hashing functions may be one-way hashing function.

In one embodiment, at S708 the client device 2A transmits the result of the compression function to the LwM2M server 4 as the device template identifier, whereby, at S710, the LwM2M server 4 uses the device template identifier as an index to a pre-computed table of values in template storage 32. When there is a match (e.g. as confirmed at S712a) then the resource template corresponding to the matched value is taken to be the resource template for the client device 2A and the LwM2M server 4 stores, at S714a the object(s), object instance(s) and/or resource(s) in the resource directory for the client device 2A to register the client device 2A.

When there is no match (e.g. as confirmed at S712b), the LwM2M server 4 may, at S714b, indicate an error to the client device 2A, and the client device 2A may then, at S716 provide identifiers for all object(s), object instance(s) and/or resource(s) to the LwM2M server 4 for, at S718, storage in the resource directory for the client device 2A.

As an additional example of how the client device 2A may generate its own template identifiers, the client device 2A transmits the result of the compression function to the LwM2M server 4 as the device template identifier and further indicates which compression function was used.

The LwM2M server 4 may perform the same compression function used by the client device 2A on various object(s), object instance(s) and/or resource(s) available to the LwM2M server 4, and when there is a match then the LwM2M server 4 stores the object(s), object instance(s) and/or resource(s) in a resource directory for the client device 2A to register the client device 2A.

As above, when there is no match, the LwM2M server 4 may indicate an error to the client device 2A, and the client device 2 may provide identifiers for all object(s), object instance(s) and/or resource(s) to the LwM2M server 4 for storage in the resource directory for the client device 2A.

As an additional example of how the client device 2A may generate its own template identifiers, the compression function may be a reversible compression function, whereby the client device 2A transmits the result of the reversible compression function to the LwM2M server 4 as the device template identifier and further indicates which compression function was used. The LwM2Mm server 4 then reverses the result to determine the device template identifier.

Such functionality means that the client device will only transmit the full list of object(s), object instance(s) and/or resource(s) to the server only if the server cannot identify the object(s), object instance(s) and/or resource(s) on the client device and requires a non-template-based registration process.

In embodiments the device management platform may distribute one or more of the resource templates in storage to another server or service (e.g. on a different device management platform). Such functionality means that resource templates can be made accessible to different entities, e.g. based on or in response to a request from the different entities.

The device management platform may only share the resource templates with another entity when that entity is authorised to access the resource templates, whereby the determination as to whether the entity is authorised may be made based on or in response to one or more identifiers associated with that entity.

In other embodiments the resource template generated by the client device may comprise code, such as binary code (e.g. from 1 bit to n-bits) to identify the object(s), object instance(s), resource(s) and/or resources instances(s) required for registration.

As an illustrative example, the client device may be configured to apply a data reducing function to generate a resource template comprising a bit stream or bit string, whereby each bit is representative of an object, object instance or resource. For example, when a bit in the bit stream of a resource template is set to a value of '1' the client device has that corresponding object, object instance, resource or resource instance (i.e. the value '1' is taken to indicate the presence of the corresponding object, object instance, resource or resource instance at the client device); and when the bit is set to a value of '0', then the client device does not have that corresponding object, object instance, resource or resource instance. (i.e. the value '0' is taken to indicate the absence of the corresponding object, object instance, resource or resource instance from the client device).

The group identifiers described above in FIGS. 9a & 9b may also be identified by one or more bit values, whereby the client device will identify the desired resources by providing the group values as a template identifier.

For example, the most commonly requested objects, object instances or resources for devices may be grouped together and identified with a single bit. The next most commonly requested objects, object instances or resources for devices may be grouped together and identified with a two bits and so on.

Similarly, the most commonly requested branch in the data structure may be identified with a group identifier comprising a single bit. The next most commonly requested branch may be identified with two bits and so on.

When a client device requires the objects, object instances or resources in a particular group it will then be able to identify the group(s) using one or more bits in the registration message, whereby the one or more bits will be taken to be the template identifier.

On receiving the registration message, the server will parse the template identifier and identify which object(s), object instance(s) or resource(s) are required to register the client device.

As an illustrative example, each bit in the bit string may correspond to a particular object, object instance, resource or group. Such functionality means that an object, object instance, resource and/or group can be identified with one or more bits.

As a further illustrative example, each object, object instance, resource and/or group may be defined by a bit code (e.g. 2 or more bits), such that when a device requires one or more objects, object instances, resources and/or groups on registration it will include that bit code in the registration message as a template identifier.

Client devices of a first device type may request some or different object(s), object instance(s) and/or resources more frequently than client devices of a second device type (e.g. chemical sensors). Thus, the objects, object instances and/or resources may be grouped differently, or the group identifiers assigned differently dependent on the client devices.

Thus, the device management platform may determine which group identifiers to use dependent on one or more device identifiers received from the client device, whilst each client device will be provisioned with the appropriate data to generate the required template identifier or resource template.

In an embodiment, to reduce the size of the registration message the client device may be configured to generate a unitary compressed expression encapsulating, in a single expression, two or more objects, object instances, resources and resource instances to be used by a server to register the client device.

As an illustrative example, a registration message may comprise a unitary compressed expression comprising a wildcard symbol, thus making the server operable to respond to any activity associated with any of the elements of the object hierarchy that fall within the group specified by the wildcard symbol.

An illustrative example of a wildcard symbol includes the asterisk '*' which may be used by a client device to request all object instances of an object, or all resources of an object (or object instance). The device may apply the data reducing function to provide a compressed expression in the form:

/3/0/*

The server would recognise the compressed expression to relate to all object instances and resources of object 3, object instance 0.

A further illustrative example of a wildcard symbol includes the question mark which may be used by a client device to request particular objects, object instances, or resources. The device may apply the data reducing function to provided a compressed expression in the form:

/3/?/3

The server would recognise the compressed expression to relate to the resource 3 of any object instance of object 3.3

A further illustrative example of a wildcard symbol is the open and close brackets '[ ]' which may be used by a client device to request particular objects, object instances, resources and/or resource instances in a range. The device may apply the data reducing function to provide a compressed expression in the form:

/3/0/[3-7]

The server would recognise the compressed expression to relate to all resources 3 to 7 inclusive, of object instance 0 of object 3.

The example compressed expressions are exemplary only, and any characters or symbols may be used to reduce a corresponding non-compressed expression.

In a further illustrative example, a registration message may comprise a unitary compressed expression in the form of a regular expression defining the criteria to be met by an element that will make the device operable to respond to any activity associated with any of the elements that fall within those specified by the regular expression. For example, such a regular expression may specify a set of values identifying elements that have names containing a specified embedded string. A regular expression may comprise a specification of those parts of the definition of an object, object instance, resource or resource instance in the object hierarchy that are required to match the criteria, and it may contain indicators that some parts of the definition of an object, object instance, resource or resource instance in the object hierarchy are to be ignored. It will be clear to one of ordinary skill in the art that these are merely examples, and that the unitary compressed expression may take many other forms, according to the requirements of the application that is the consumer of the information provided by the client device in response to activity associated with identifying elements of the client device's object hierarchy to the server.

Using compressed expressions reduces the registration message in comparison to the device having to provide individual identifiers for all the object(s), object instance(s), resource(s) and/or resource instance(s) thereon. Such functionality may be particularly useful when a server is not capable of using template based registration, and the device would otherwise be required to enumerate all of its object(s), object instance(s), resource(s) and/or resource instance(s) to the server.

Figure 11:
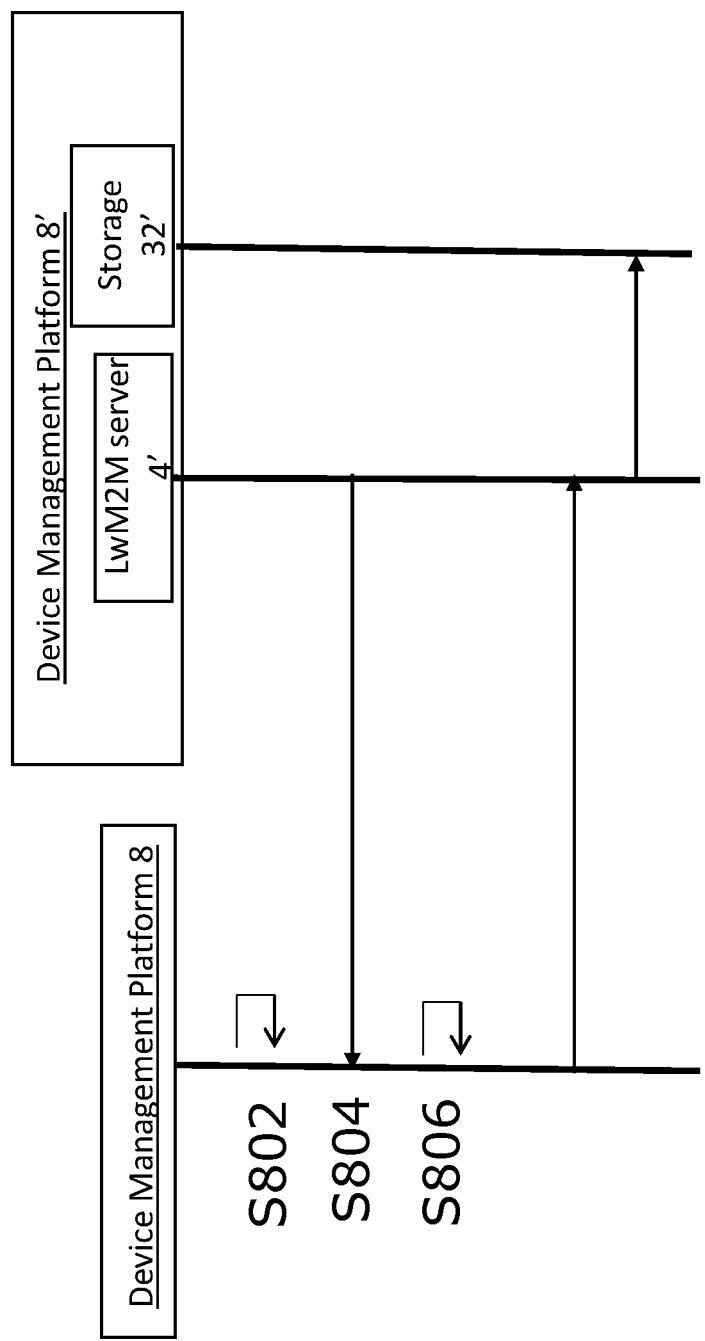
FIG. 11 shows an example of a first device management platform provisioning a second device management platform with a resource template for a particular device type.

FIG. 11 shows an illustrative example of a first device management platform 8 provisioning a second device management platform 8' with a resource template for a particular device type.

At S802, first device management platform 8 obtains a resource template for a device type, and whereby the resource template is stored in template storage. Such a resource template may be generated using any suitable means, such as, for example, in accordance with any of the FIGS. 3 to 10 described above.

At S804 the first device management platform receives a request from the second device management platform for a resource template for a device type. The request may include credential data for the second device management platform 8'. In another embodiment the request may be received via a client device.

At S806 the first device management platform determines the authorisation status for the device management platform, and when authorised the first device management platform, at S808, provides the requested resource template to the second device management platform (e.g. via an interface at the LwM2M server 4').

At S810, the resource template is stored in template storage 32' on the second device management platform and made available to servers/services thereat.

Such functionality means that when a device management platform is not capable of generating a resource template for a particular device type it can request one from another device management platform.

The techniques also provide for making the resource templates available to servers/services on the same device management platform, whereby only authorised servers or services may be provided with access to template storage. As such when an unauthorised server or service requests a particular resource template the template storage may return an error.

Furthermore, the present techniques also provide that a server or service can analyse the different resource templates to identify similarities and to generate sub-templates to enable more efficient description of composite devices (such as certain types of LwM2M gateways).

Whilst the illustrative examples above describe the client device as generating the device template identifier, this may be provisioned thereon (e.g. during a bootstrap process), thereby reducing the computational burden on the client device.

Furthermore, whilst the server 4 above is generally described as a LwM2M server, the claims are not limited in this respect and in embodiments the server 4 may be an OMA Device Management (DM), a TR-069 server or a server which follows a standard/protocol set by the Open Connectivity Foundation or Open Interconnect Consortium.

Embodiments of the present techniques may provide implementations which conform to the Open Mobile Alliance Lightweight Machine to Machine Technical Specification, Version 1.0 and to one or more revision(s) thereof, including, for example, Versions 1.0.2, 1.1 and 1.3. It will be appreciated that the claims are not limited in this respect.

Embodiments of the present techniques also provide a non-transitory data carrier carrying code which, when implemented on a processor, causes the processor to carry out the methods described herein.

The techniques further provide processor control code to implement the above-described methods, for example on a general purpose computer system or on a digital signal processor (DSP). The techniques also provide a carrier carrying processor control code to, when running, implement any of the above methods, in particular on a non-transitory data carrier or on a non-transitory computer-readable medium such as a disk, microprocessor, CD- or DVD-ROM, programmed memory such as read-only memory (firmware), or on a data carrier such as an optical or electrical signal carrier. The code may be provided on a (non-transitory) carrier such as a disk, a microprocessor, CD- or DVD-ROM, programmed memory such as non-volatile memory (e.g. Flash) or read-only memory (firmware). Code (and/or data) to implement embodiments of the techniques may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog™ or VHDL (Very high speed integrated circuit Hardware Description Language). As the skilled person will appreciate, such code and/or data may be distributed between a plurality of coupled components in communication with one another. The techniques may comprise a controller which includes a microprocessor, working memory and program memory coupled to one or more of the components of the system.

Computer program code for carrying out operations for the above-described techniques may be written in any combination of one or more programming languages, including object oriented programming languages and conventional procedural programming languages. Code components may be embodied as procedures, methods or the like, and may comprise sub-components which may take the form of instructions or sequences of instructions at any of the levels of abstraction, from the direct machine instructions of a native instruction set to high-level compiled or interpreted language constructs.

It will also be clear to one of skill in the art that all or part of a logical method according to the preferred embodiments of the present techniques may suitably be embodied in a logic apparatus comprising logic elements to perform the steps of the above-described methods, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In an embodiment, the present techniques may be realised in the form of a data carrier having functional data thereon, said functional data comprising functional computer data structures to, when loaded into a computer system or network and operated upon thereby, enable said computer system to perform all the steps of the above-described method.

Those skilled in the art will appreciate that while the foregoing has described what is considered to be the best mode and where appropriate other modes of performing present techniques, the present techniques should not be limited to the specific configurations and methods disclosed in this description of the preferred embodiment. Those skilled in the art will recognise that present techniques have a broad range of applications, and that the embodiments may take a wide range of modifications without departing from any inventive concept as defined in the appended claims.

The invention claimed is:

1. A computer implemented method comprising:
   receiving, at a first server, one or more device identifiers from a device; and,
   determining, with the first server, the availability of a resource template for the device based on or in response to the one or more device identifiers;
   when the resource template for the device is available:
   provisioning, from the first server to the device, a template identifier to enable the device to register with a second server using the template identifier.

2. The method of claim 1, wherein determining the availability of a resource template for the device comprises:
   determining, with the first server; a device type for the device based on or in response to the one or more device identifiers; and,
   determining, with the first server, the availability of the resource template for the device based on or in response to the device type.

3. The method of claim 2, wherein:
   the device type relates to one or more of: an object, object instance, resource and resource instance at the device.

4. The method of claim 1, comprising:
   when the resource template for the device is not available:
   generating, with the first server, the resource template the device based on or in response to the one or more device identifiers; and,
   making the resource template for the device available to the second server.

5. The method of claim 4, wherein making the resource template available to the second server comprises:
   transmitting the resource template to the second server.

6. The method of claim 4, wherein making the resource template available to the second server comprises:
   storing the resource template in storage for access by the second server.

7. The method of claim 4, further comprising:
   provisioning a template identifier on the device to enable the device to identify the resource template made available to the second server.

8. The method of claim 1, comprising:
   when the resource template is not available for the device:
   provisioning the device with instructions to cause the second server to generate the resource template.

9. The method of claim 8, wherein the instructions comprise: one or more of a flag and code.

10. The method of claim 1, comprising:
    when the resource template is not available for the device:
    determining whether a resource template should be generated for the device.

11. The method of claim 10, wherein determining whether a resource template should be generated for the device comprises:
    determining whether the number of devices having the same device type as the device has reached a threshold.

12. The method of claim 1, wherein:
    the one or more device identifiers comprise one or more of: a manufacturer identifier; a manufacturer hardware identifier; a device class identifier; a firmware version identifier; a security identifier; and a communication type identifier.

13. The method of claim 1, wherein the first server comprises a LwM2M bootstrap server.

14. The method of claim 1, wherein the second server comprises a LwM2M server.

15. The method of claim 1, wherein the device comprises a LwM2M device.

16. A computer implemented method performed by a device comprising:
    transmitting, to a first server, one or more device identifiers;
    receiving, from the first server, a template identifier for a resource template corresponding to the one or more device identifiers; and,
    transmitting, to a second server, a registration request comprising the template identifier to enable the second server register the device using the corresponding resource template.

17. A non-transitory computer readable storage medium comprising code which when implemented on a processor causes the processor to carry out the method of claim 1.

18. A system comprising:
    a device; and
    a server;
    wherein the server is to receive, from the device, one or more device identifiers;
    determine, the availability of a resource template for the device based on or in response to the one or more device identifiers;
    when the resource template for the device is available:
    provision, on the device, a template identifier to enable the device to register with a second server using the template identifier.

* * * * *